Nov. 7, 1939.  H. S. GATES  2,179,329

ELECTRICAL APPARATUS

Filed May 22, 1937

WITNESSES:
William B. Sellers.
James K. Ely

INVENTOR
Henry S. Gates.
BY Ezra W. Savage
ATTORNEY

Patented Nov. 7, 1939

2,179,329

UNITED STATES PATENT OFFICE 2,179,329

ELECTRICAL APPARATUS

Henry S. Gates, Sharon, Pa., assignor to Westinghouse Electric & Manufacturing Company, East Pittsburgh, Pa., a corporation of Pennsylvania Application May 22, 1937, Serial No. 144,180

3 Claims. (Cl. 200—50)

This invention relates to electrical apparatus and particularly to grounding switches.

In the operation of electrical apparatus such as transformers, different types of grounding switches have been developed for insuring a movement of the switch to connect the power line to the transformer before grounding the power line. Thus, if the power line is alive, the transformer is so energized that an associated interlock locks the switch member and prevents further movement of the switch member to the ground position.

The different types of grounding switches developed for such use, however, do not permit an inspection of the transformer when the transformer is connected to the power line but not connected in the network. This is a serious disadvantage since in many cases a plurality of transformers are connected to the same high voltage feeder cable and in order to ground the power line, it is necessary to deenergize the feeder cable and all of the transformers connected to it.

An object of this invention is to provide a switch for connecting a power source to the windings of an electrical apparatus or to ground and for disconnecting them therefrom while providing for preventing the operation of the switch to its ground position when the apparatus is energized, although permitting free movement of the switch between the apparatus and disconnect position when the apparatus is connected to and energized only by the power source.

Figure 1:
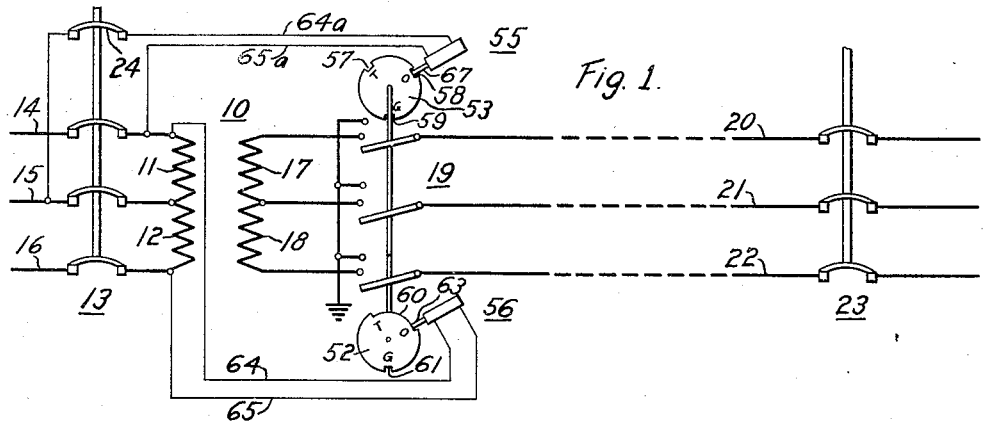

This invention together with other objects will be better understood from the following description when taken in conjunction with the accompanying drawing, in which:

Figure 1 is a schematic view illustrating a three-phase transformer, its primary and secondary circuits and a three-phase grounding switch connected in one of the circuits.

Figures 2, 3, 4:
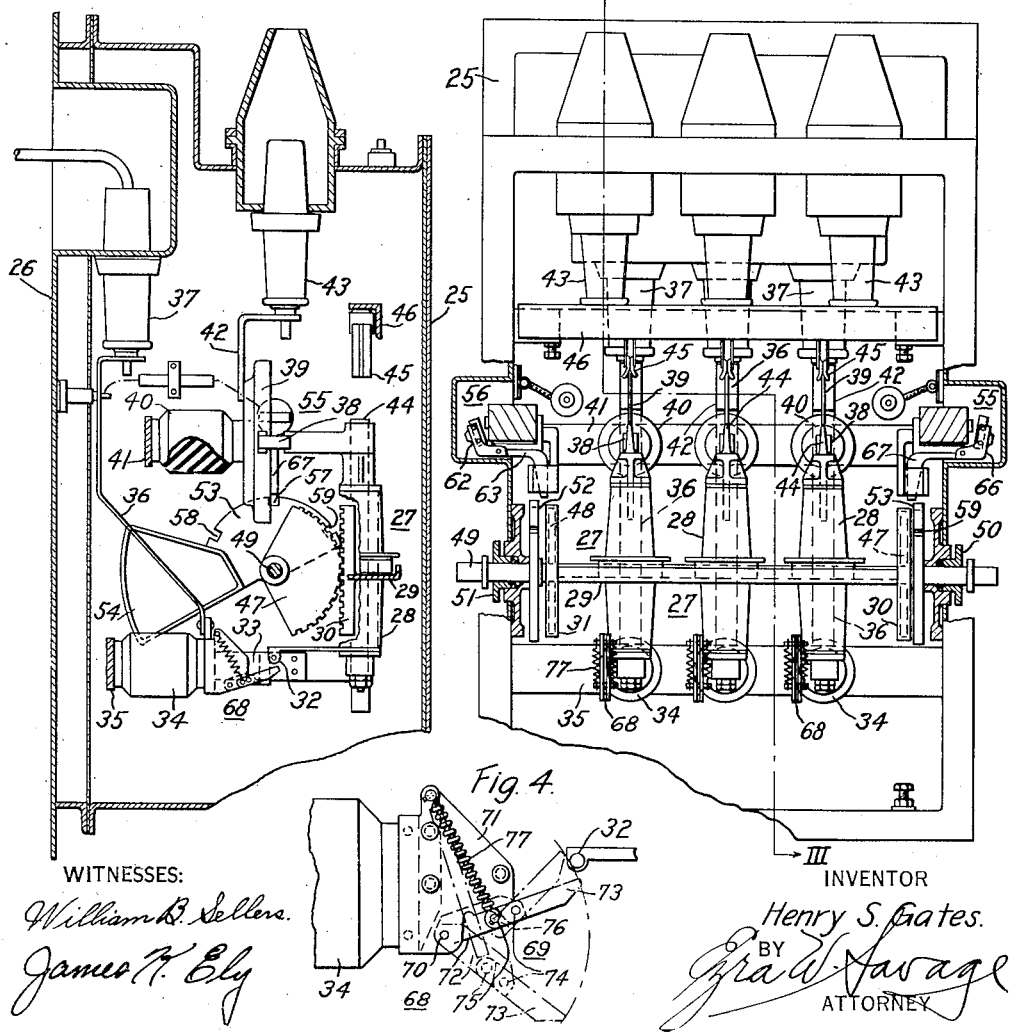

Fig. 2 is an elevational view partly in section of a grounding switch and its operating mechanism disposed within a suitable switch casing, the front cover of which is shown removed, Fig. 3 is a sectional view taken along the line III—III of Fig. 2, showing a portion of the operating mechanism, and the switch, a part of which is broken away; and Fig. 4 is an enlarged view of the quick break mechanism shown in Fig. 3.

This invention is illustrated as embodied in a circuit in which it is desired to protect an electrical apparatus such as a transformer.

Referring to the drawing and to Fig. 1 in particular, this invention is illustrated as applied to a circuit in which a transformer 10 having low voltage windings 11 and 12 is connected by means of a circuit breaker or line switch 13 to the three conductors 14, 15 and 16 of a lower voltage three-phase circuit or network system. The high-voltage windings 17 and 18 of the transformer 10 are connected through a three-phase grounding switch, shown generally at 19 to high voltage feeder conductors 20, 21 and 22 and through the circuit breaker 23 to a high voltage power source, not shown. As illustrated, the line switch 13 also carries an auxiliary switch member 24 for connecting certain of the operating mechanism of the grounding switch 19 in circuit with the low voltage three-phase circuit or network system when the line switch 13 connects the transformer 10 to the network system, as hereinafter described.

In this embodiment the actuating mechanism and switch members of the grounding switch 19 are disposed in the enclosing case 25, as shown in Figs. 2 and 3. The enclosing case 25 is suitable for mounting on the case 26 of a transformer, as shown in Fig. 3 or on a wall. Where it is desired to immerse the switch members and operating mechanism of the switch in oil or other suitable dielectric, the case 25 may be so fabricated as to be leak proof. In this type of structure, a valve, not shown, of suitable construction is usually carried in the bottom of the case for withdrawing the dielectric from the case.

In the embodiment illustrated, the grounding switch 19 is provided with a multiple pole switch member 27, each member of which is carried in a bushing 28 which is suitably mounted on a bushing bridge 29. The ends of the bushing bridge 29 are attached in a suitable manner to racks 30 and 31, respectively, the racks being so mounted in guides, not shown, in the case that they are disposed for reciprocating movement when actuated, as hereinafter described.

As illustrated in Fig. 3, the lower end of each member of the multiple pole switch member 27 is provided with a terminal 32 disposed to slidingly engage a transformer terminal contact member 33, which is carried by an insulating bushing 34. In order to support the bushings 34 and the contact members 33, the bushings are carried by a bushing bridge 35, the ends of which are bolted or otherwise permanently attached to the walls of the case 25. A conductor strap 36 is provided for connecting each of the contact members 33 through the terminal bushing 37 disposed to extend through the transformer case 26 to the windings 17 and 18 of the transformer.

The upper end of each member of the movable switch member 27 carries a terminal 38 disposed to slidingly engage a line terminal contact member 39 which is carried by an insulating bushing 40. The insulating bushings 40 are suitably mounted on a bushing bridge 41 rigidly bolted to the walls of the case 25. Each of the contact members 39 is connected by a conductor strap 42 through a line terminal bushing 43 carried in the top of the case 25 to the conductors 20, 21 and 22 of the power line. In a preferred modification each of the line terminal contact members 39 is in the form of an elongated knife switch of such a length that at no time during a movement of the switch assembly 27 will the sliding electrical engagement between the contact members 38 and their associated line terminal contact members 39 be broken.

In addition to the contact members 38 each of the members of the movable switch member 27 carries a contact member 44 at its upper end disposed to engage an associated ground terminal contact member 45 for grounding the conductors 20, 21 and 22 when the transformer is not energized and the switch assembly is moved to the ground position where it bridges the line terminal contact members 39 and the ground terminal contact members 45, as described hereinafter. The ground terminal contact members 45 are carried by a supporting bar 46, the ends of which may be attached to the case for grounding the contacts.

In order to actuate the racks 30 and 31 to move the multiple pole switch member 27 gear sectors 47 and 48 adapted to engage the racks 30 and 31, respectively, are suitably mounted on a shaft 49 mounted through stuffing glands 50 and 51 in the opposite sides of the case 25. A plurality of segments or disks 52 and 53, each of which is provided with a counterbalance 54 to counterbalance the weight of the gear sectors and the switch assembly are disposed on the shaft 49 adjacent the gear sectors 48 and 47, respectively. Each of the segments 52 and 53 have a plurality of notches disposed in predetermined spaced relation about the periphery.

As illustrated in Figs. 1 and 3, segment or disk 53 is provided with three spaced notches 57, 58 and 59 of equal size spaced about its periphery while segment 52 is provided with two notches 60 and 61. It is noted that notch 60 is an elongated notch extending for a distance along the periphery of the segment 52 equal to the distance between notches 57 and 58 of segment 53, the purpose of which will be explained more fully hereinafter.

In order to limit the movement of the switch assembly 27 in response to predetermined conditions, a plurality of interlocks 55 and 56 are disposed within the case adjacent the segments 53 and 52, respectively, for engaging the notches therein in a predetermined manner when energized.

The windings of interlock 56 are electrically connected through conductors 64 and 65 extending through the case 25 to the low voltage windings 11 and 12 of the transformer 10, as shown in Fig. 1. The armature 62 of the interlock 56 carries an extended arm 63 disposed for entering the elongated notch 60 in the segment or disk 52 when the interlock 56 is energized, as hereinafter described.

The interlock 55 is similar to interlock 56 and has its windings electrically connected through conductors 64a and 65a and the auxiliary switch 24 carried by the line switch 13 to the conductors of the network system when the line switch 13 connects the transformer 10 to the network system. The armature 66 of interlock 55 is similar to the armature 62 of interlock 56 in that it carries an extended arm 67 disposed for entering any one of the notches 57, 58 and 59 in the segment or disk 53 when energized, depending upon the position of the segment and the switch assembly. The armature arms 63 and 67 of interlocks 56 and 55 respectively are of the type which are so counterweighted that they will be free of the notches in the disks 52 and 53 when the interlocks are deenergized.

As viewed in Figs. 2 and 3 of the drawing, the multiple pole switch assembly 27 is in the apparatus or transformer position. That is, the switch members bridge the line terminal contact members 39 and the transformer terminal contact members 33 to close a circuit from the power source through circuit breaker 23 and conductors 20, 21 and 22 to the transformer 10. With the switch assembly in this position, the windings of interlock 56 are energized and the extended arm of armature 62 is actuated to enter the elongated notch 60 in the segment 52 to limit the movement of the segment or disk and consequently limit the movement of the switch assembly.

As illustrated, the elongated notch 60 in disk 52 extends along the periphery of the disk from the disconnect or open position where the switch assembly does not bridge a plurality of contacts to the transformer position when the switch assembly is in the transformer position. The spaced notches 57, 58 and 59 in disk 53 are of a size suitable for receiving the extended arm of armature 66 of interlock 55 and are so spaced that they are about the segment in positions corresponding to the open, transformer and ground positions, respectively, when the movable switch assembly is in the transformer position.

Because of the position of the notch 60, movement of the switch assembly to the ground position is prevented when the transformer is energized. This is because the armature arm 63 of interlock 56 engages the end of the elongated notch at the transformer position on the disk when the assembly is in the transformer position and prevents a further movement of the switch members. Free movement of the switch assembly between the transformer and open positions when the transformer is connected only to the power source is, however, not prevented because the segment or disk 52 may be rotated in a clockwise direction, as shown in Fig. 1, until the armature arm 63 of interlock 56 engages the other end of the notch 60.

In moving the switch assembly 27 from the transformer position to the open position when the circuit breaker 23 connects the transformer with the feeder or power line, it is necessary to open the exciting or magnetizing current of the transformer. In order to aid in breaking this circuit, a quick break mechanism 68 may be disposed upon each of the bushings 34 which carry the transformer terminal contact members 33.

Referring to the drawing and Fig. 4 in particular, the quick break mechanism 68 illustrated comprises a linkage mechanism 69 pivotally mounted as by means of a pivot pin 70 on a support 71 carried by the bushing 34. The linkage mechanism 69 comprises two links 72 and 73 pivotally coupled by a pin 74 at the end of link 72 and between the ends of link 73. The link 73 may have a U-shaped end disposed for fitting over the end of link 72 and carries a pin 75 disposed to enter a recess 76, in link 72 to limit the movement of link 73 in a clockwise direction about its pivot pin 74.

In order to position the linkage 69 where the link 73 projects into the path of movement of contact member 32 for engagement therewith at the transformer position, a spring 77 is disposed between the support 71 and pivot pin 75 for biasing the linkage mechanism 69 against the support. In this position the link 73 projects into the path of movement of contact member 32 when the switch assembly 27 is in the transformer position and as the switch assembly moves from the transformer position to the open position. As the switch assembly approaches the open position, the linkage mechanism 69 is biased about its pivot pin 70 to a position where the contact member 32 clears the end of link 73. When this occurs the spring 77 functions to return the linkage mechanism with a snap action to its straight line position where it abuts the support 71.

Upon a return of the switch assembly from the open position to the transformer position, the contact member 32 engages the end of link 73, causing it to pivot in a counter-clockwise direction about its pivot pin 74 to a point where the contact member 32 clears the end of the link 73. When this occurs, the spring 77 biases the link 73 back to its normal straight line position with the link 72 projecting into the path of movement of the contact member 32 from the transformer to the open position.

When the movable switch assembly 27 is in the transformer position and the circuit breaker 23 is closed to connect the transformer with the power source, the line switch 13 and the auxiliary switch 24 carried thereby may be actuated to their circuit closing position to connect the low voltage windings 11 and 12 of the transformer 10 to the conductors 14, 15 and 16 of the network system and the windings of interlock 55 in circuit with the network system. When the windings of interlock 55 are energized, the armature arm 67 of interlock 55 engages the notch 58 to lock the switch assembly in the transformer position. As will be evident from the drawing, if the multiple pole switch assembly 27 should be in either the open position or the ground position when the line switch 13 connects the transformer in the network system, the armature arm 67 of the interlock 55 engages the notch 57 or 59, respectively, depending upon the position of the switch assembly, to lock the segment or disk 53 in that position and prevent movement of the switch assembly.

In order to actuate the movable switch member 27 to the ground position, line switch 13 and circuit breaker 23 must be opened to deenergize the windings of interlocks 55 and 56. When the windings of the interlocks 55 and 56 are deenergized, the armature arms 67 and 63, respectively, are withdrawn from the notches in their associated disks 53 and 52, respectively. The movable switch assembly 27 may then be moved to the ground position by actuating the shaft 49 by any suitable means, such as by an operator's handle, not shown, to cause the gears 47 and 48 to rotate in a counter-clockwise direction to actuate the racks 30 and 31 to cause the movable switch assembly 27 to move in a vertical direction to the desired position. As the movable switch assembly 27 is actuated to its ground position, it is noted that the contact members 38 carried by each of the members of the movable switch assembly maintain their sliding engagement with their associated elongated line terminal contacts 39.

For the purpose of explaining the operation of the grounding switch of this invention, it may be assumed that the movable switch assembly 27 is in its disconnect or open position, in which position it does not bridge a plurality of contacts or close a circuit. With the switch assembly 27 in this position if it is desired to ground the power line, the shaft 49 may be rotated in a counter-clockwise direction to cause a movement of the switch assembly in a vertical direction toward its ground position, as explained hereinbefore. If, however, the circuit breaker 23 should be closed when the switch assembly 27 is in the open position, then the movable switch assembly 27 may be actuated to only the transformer position since the interlock 56 is energized to actuate its armature arm 63 to enter the notch 60 of segment or disk 52 to prevent movement of the switch assembly beyond the transformer position, as explained hereinbefore. If in addition to the circuit breaker 23 the line switch 13 is also closed to connect the transformer to the conductors of the network system when the switch assembly 27 is in the open position, then the windings of the interlock 55 are so energized that the armature arm 67 of interlock 55 is actuated to enter the notch 58 of disk 53 to prevent movement of the switch assembly from the open position.

By reason of the interlock 55 and 56, movement of the switch assembly 27 to either the open or the ground position is prevented when the switch member is in the transformer position and the line switch 13 and the circuit breaker 23 are closed. However, if line switch 13 is open and circuit breaker 23 only is closed to energize the transformer 10, then the interlock 56 only is energized to limit the movement of the switch assembly 27 because of the shape of the notch 60 and its position in the segment or disk 52, as explained hereinbefore. Free movement of the switch assembly 27 may be had when the transformer 10 is connected only to the power line to permit movement of the switch assembly between the transformer and open positions only.

The switch assembly may be moved from the transformer to the open position without serious damage to the contacts when the transformer is connected only to the feeder cable, since the only current to be opened is the magnetizing current in the transformer. The quick break assembly 68, described hereinbefore, aids in opening the magnetizing current and in preventing detrimental arcing between the contact members 32 and the transformer terminal contact members 33. Further movement of the switch assembly 27 from the transformer position to the ground position may be had only if the circuit breaker 23 and the line switch 13 are open to deenergize the transformer 10 and the windings of interlocks 55 and 56.

As illustrated in Figs. 1 and 2 of the drawing, the movable switch members 27 and their associated transformer terminal contact members 33, line terminal contact members 39 and ground contact members 45 are so positioned that the movable switch members 27 must move progressively from an open position through transformer position to the ground position. Positive means are thus provided for assuring movement of the switch assemblies 27 to the transformer position before being actuated to the ground position.

Although not illustrated, the operating handle usually provided with shaft 49 carrying the segments or disks 52 and 53 is provided with means for securing a positive stop of the operating mechanism of the switch in the transformer position. This provides a time element in which the windings of interlocks 55 and 56 may be energized if the transformer 10 is connected to the conductors of the network system or to the power line.

In a modification of this invention, the armature arm 67 of interlock 55 may be so counter-weighted as to enter the notches in disk 53 when the coil is deenergized. Where this type of interlock is employed, the auxiliary switch 24 may be so disposed with respect to the line switch 13 that it is in the open position to disconnect the interlock 55 from the network system when the line switch 13 connects the transformer 10 to the network system and is in the circuit making position to energize the coil of interlock 55 when the line switch 13 is in the open or disconnect position. Thus, with the line switch 13 connecting the transformer to the network system when the transformer is connected to the feeder, the counter-weighted armature arm 67 of the deenergized interlock 55 engages a notch in disk 53 to prevent movement of the grounding switch. In order to actuate the grounding switch, it is, therefore, necessary to actuate the line switch 13 to its circuit interrupting position where the auxiliary switch 24 connects the coils of the interlock 55 to the network system. When the interlock 55 is thus energized, the armature arm 67 is withdrawn from the notch of disk 53, permitting free movement between the open and transformer positions of the grounding switch, as described hereinbefore.

It is thus evident that the grounding switch of this invention the feeder cable cannot be connected to ground until after the transformer is deenergized or disconnected from the network system. It is further evident that the desired movement of the movable switch assembly to the transformer position before entering ground position from a disconnect or open circuit position is attained without the aid of mechanical interlocks.

Further advantages are obtained in the grounding switch of this invention, in that a free movement of the movable switch members between the transformer and open positions is obtained when the transformer is connected only to the feeder cable, thus permitting inspection of the transformer without necessitating the deenergization of the feeder cable and all of the transformers connected to it. It is thus possible when the line switch connecting the transformer to the network system is in the open circuit position to actuate the switch assembly between the transformer and open positions regardless of whether the feeder is energized and to actuate the switch assembly from the transformer position to ground position when the transformer 10 is disconnected from the feeder cable. With the grounding switch of this invention it is, therefore, possible to move the switch assembly to the open position, opening the magnetizing current of the transformer while preventing movement of the switch assembly to open the load current.

Although this invention has been described with reference to a particular embodiment thereof, it is, of course, not to be limited thereto, except insofar as is necessitated by the prior art and the scope of the appended claims.

I claim as my invention:

1. A grounding switch comprising, in combination, a multiple pole switch member having an open, transformer and ground position, means associated with the switch member for actuating it progressively to said open, transformer and ground positions and reverse, and means operable with the switch member and responsive to predetermined conditions for limiting the movement of the switch member, said means operable with the switch member comprising a plurality of disks and electromagnetically operated members associated therewith for engaging the disks, the disks and associated electromagnetically operated members being disposed on opposite sides of the switch member, one of the disks and its associated member co-operating when the electromagnetically operated member is energized to permit free movement of the switch member between the transformer and open positions and to prevent movement of the switch member from transformer to ground position, another of said disks and its associated member cooperating under predetermined conditions to lock the switch member against movement.

2. A grounding switch comprising, in combination, a multiple pole switch member having an open, transformer and ground position, stationary contact members associated with the multiple pole switch member in the transformer and ground position, means associated with the switch member for actuating it progressively through the positions open, transformer and ground and reverse to engage the stationary contact members, means operable with the switch member and responsive to predetermined conditions for limiting the movement of the switch member, said means operable with the switch member comprising a plurality of disks and electromagnetically operated members associated therewith for engaging the disks under predetermined conditions, the disks and associated engaging members being disposed on opposite sides of the switch member, one of the disks and its associated member cooperating under predetermined conditions to permit free movement of the switch member between the transformer and open positions and to prevent movement of the switch member from transformer to ground position, and a quick-break mechanism associated with the switch member and the stationary contact members in the transformer position disposed for cooperating with the switch member as the switch member is moved from the transformer position to the open position to effect a fast disengagement of the switch member and the stationary contact members in the transformer position, another of said disks and its associated member cooperating under predetermined conditions to lock the switch member against movement.

3. A grounding switch comprising, in combination, a multiple pole switch member having an open, transformer and ground position, means associated with the switch member for actuating it progressively to the positions open, transformer and ground and reverse, and means operable with the switch member and responsive to predetermined conditions for limiting the movement of the switch member, said means operable with the switch member comprising a plurality of disks having notches therein and electromagnetically operated members associated therewith for engaging the notches of the disks under predetermined conditions, the disks and associated engaging members being disposed on opposite sides of the switch member, one of the disks having an elongated slot in its periphery for receiving its associated engaging member under predetermined conditions for permitting free movement of the switch member between transformer and open positions and preventing movement of the switch member from transformer to ground position, another of the disks having notches spaced about its periphery corresponding to open, transformer and ground positions of the switch member for receiving its associated engaging member under predetermined conditions to lock the switch member against movement irrespective of the position of the switch member.

HENRY S. GATES.